March 18, 1958 A. E. KRULL 2,826,984
BARBECUE OVEN AND GRILL, STATIONARY OR PORTABLE
Filed Aug. 2, 1954 2 Sheets-Sheet 1
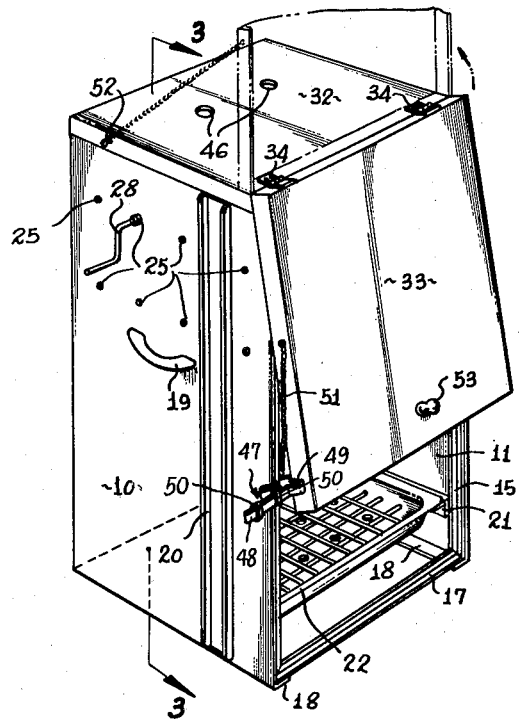
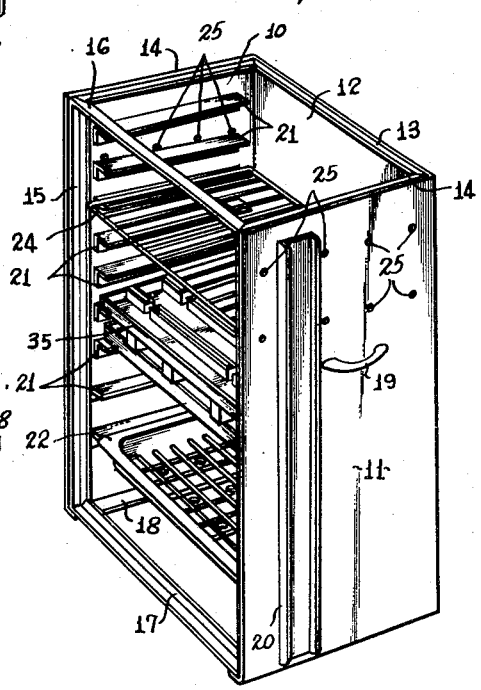
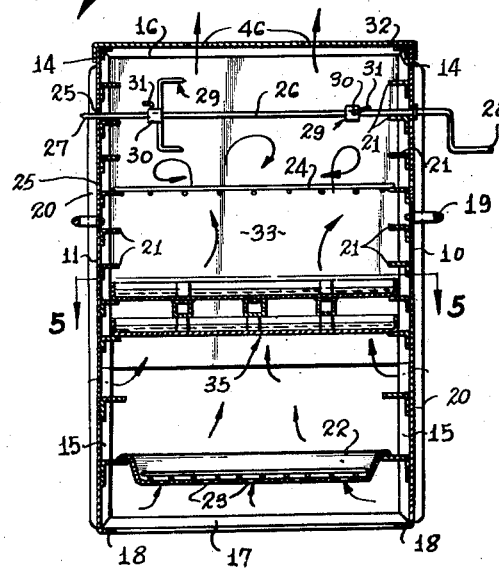
INVENTOR.
ALFRED E. KRULL March 18, 1958 A. E. KRULL 2,826,984
BARBECUE OVEN AND GRILL, STATIONARY OR PORTABLE
Filed Aug. 2, 1954 2 Sheets-Sheet 2
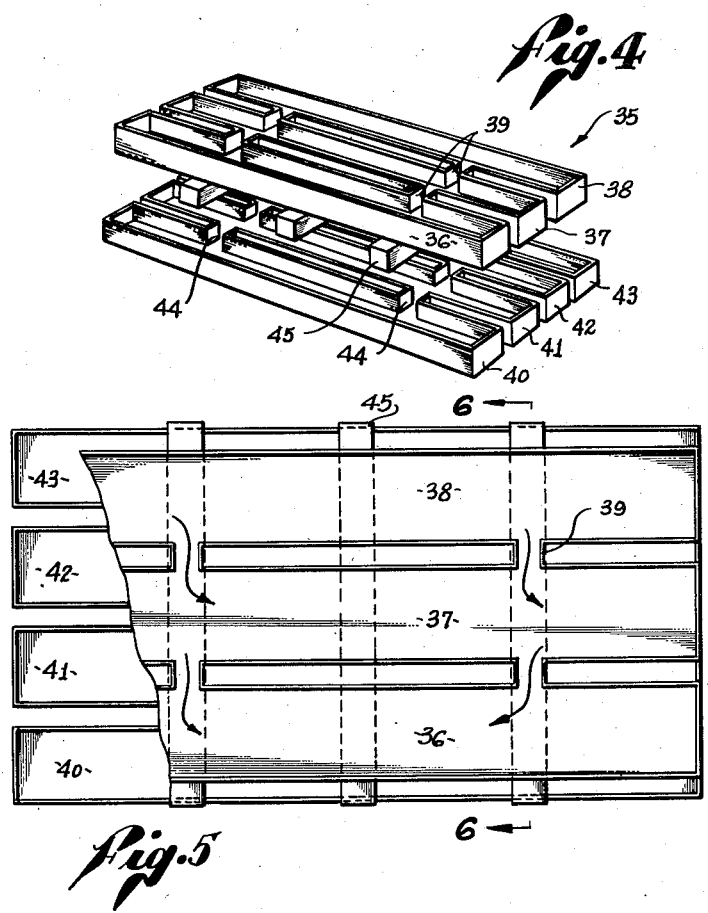
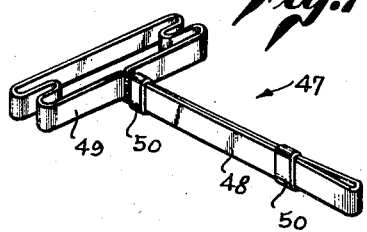
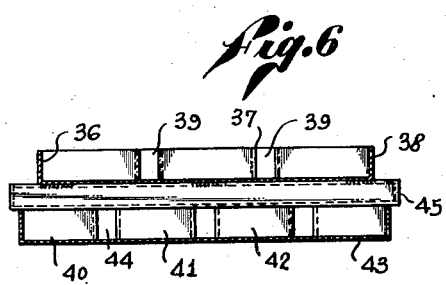
INVENTOR.
ALFRED E. KRULL
BY
Attorneys United States Patent Office 2,826,984
Patented Mar. 18, 1958

2,826,984
BARBECUE OVEN AND GRILL, STATIONARY OR PORTABLE

Alfred E. Krull, Los Angeles, Calif.

Application August 2, 1954, Serial No. 447,329

6 Claims. (Cl. 99—446)

The present invention relates to stoves and particularly to a barbecuing stove for cooking meats in an improved manner.

In barbecuing meat it has been found that the flavor and tenderness of the meat are greatly improved if the meat is surrounded by steam and smoke during the cooking operation. On of the reasons for this is that the steam increases the humidity in the cooking area sufficiently to cause the meat to retain its juices during the cooking operation. However, it has been found that a barbecuing stove must be provided with means whereby the cooking heat and the amount of smoke and steam allowed to circulate around the meat can be regulated in order to obtain the best results. Also, grease drippings from the cooking meat must not be allowed to fall upon the fire so as to cause a flare-up of flames since this prevents the maintenance of a uniform cooking heat.

It is a major object of this invention, therefore, to provide a stove for barbecuing purposes of improved design.

A further object of the present invention is to provide a barbecuing stove which has means for regulating the cooking heat and the amount of smoke and steam caused to circulate around the cooking meat and which has a water pan structure which prevents grease drippings from falling into the fire while still allowing the smoke, steam and heat to pass therethrough.

Another object of the invention is to provide a barbecuing stove which is easily portable, which is pleasing in appearance, which can also be used for ordinary grilling purposes and which can be manufactured easily and inexpensively.

Other objects and advantages of the stove of the present invention will be readily evident to those familiar with the art upon perusal of the following description and accompanying drawings in which:

Figure 1 is a perspective view of a barbecuing stove embodying the principles of the present invention with the stove door being shown in a semi-open position and indicated in its fully open position in dotted lines;

Figure 2 is a perspective view of the stove of Figure 1, looking from a different angle, and with the cover and stove door removed;

Figure 3 is a vertical cross-sectional view of the stove taken on the line 3—3 of Figure 1;

Figure 4 is a perspective view of the water pan structure shown in Figure 2, slightly enlarged;

Figure 5 is a plan view of the structure shown in Figure 4, with a portion of the water pans of the upper layer being cut away, and slightly enlarged;

Figure 6 is a vertical cross-sectional view taken on the line 6—6 of Figure 5; and Figure 7 is a perspective view of the adjusting tool shown in Figure 4, slightly enlarged.

Referring now to Figures 1, 2, and 3 of the drawings, wherein a preferred form of stove made according to the present invention is illustrated, a continuous piece of sheet metal stock is bent into U-shape so as to form two side panels 10 and 11 and a back panel 12 of the stove. The upper end of each of the side panels and of the back panel is reinforced by a frame consisting of a rigid back member 13, and a pair of rigid side members 14, each of these frame members being preferably formed of L-shaped angle iron and fixed as by welding to the respective side and back panels of the stove. The front opening of the stove is reinforced by a rectangular-shaped frame comprising rigid side members 15 preferably fixed as by welding to the respective side panels 10 and 11 adjacent the forward ends thereof and interconnecting top and bottom members 16 and 17, each of these frame members also being preferably formed of L-shaped angle iron. The rigid side members 14 are fixed to the top frame member 16 so that the stove is boxlike in form with an open top and front. The side panels 10 and 11 and the back panel 12 have an inwardly bent portion 18 at the bottom thereof to provide a supporting surface for the stove, and a handle 19 is suitably attached to each of the side panels 10 and 11 for making the stove more easily portable. A channel-shaped rigid member 20 is fixed as by welding to each of the side panels 10 and 11 adjacent the handle thereof for reinforcing the side panels.

On the inner surface of each of the side panels 10 and 11 are suitably fixed a plurality of vertically spaced opposed supporting rails 21, each of these rails being preferably L-shaped in cross-section and fixed to the respective side panel so as to provide a supporting surface.

A fire box 22, preferably in the form of a sheet metal stamping and formed with a plurality of draft openings 23, is provided and so shaped as to be supported on a pair of opposed rails 21 in the interior of the stove. It will be appreciated that the fire box 22 can be supported on any pair of opposed rails 21 for selectively positioning the fire box according to the requirements in cooking. Grids 24 of any suitable construction are also provided and so shaped as to be carried in selective positions in the cooking area of the stove on opposed supporting rails 21.

A plurality of opposed openings 25 are formed in each of the side panels 10 and 11 adjacent the upper ends thereof for receiving and supporting suitable spits 26. The spit 26 has one end pointed as at 27 and the other end formed in the shape of a handle 28. A pair of meat forks 29, each of which has a hub portion 30, is rotatably and slidably received on the spit and a set screw 31 is threadedly received by the hub. It will be appreciated therefore that each of the meat forks 29 can be selectively positioned on the spit 26 and locked in its selected position by tightening set screw 31 against the spit 26.

The oven as described up to this point can be used as an outdoor grill for ordinary grilling purposes and the selective positioning of the fire box, the grid, or grids, and/or the spits permits the food being cooked to be selectively positioned relative to the cooking heat for maximum cooking efficiency.

For effecting a higher cooking heat in the interior of the stove and for retaining the heat therein for faster cooking purposes, a removable cover 32 is provided which is formed and shaped so as to fit snugly on the top of the side and back panels of the stove. An oven door 33, also preferably formed of sheet metal, is hingedly connected to the cover 32 by suitable hinges 34 for up and down swinging movement relative thereto, and the oven door is so shaped as to close the major portion of the front opening of the stove when allowed to assume its downwardly extending closed position. The length of the door 33 may conveniently be approximately two-thirds or more the height of the side panels so that when the door assumes its closed position the unclosed stove opening allows sufficient air into the interior of the stove to support combustion as well as to allow the escape of smoke from the cooking area as will be more fully appreciated hereinafter. In some instances it will be desired to position the fire box and the door so that the latter in closed position extends down to or below the fire box to give maximum smoke treatment to the meat.

To further enhance the efficiency of the stove, for certain cooking operations such as barbecuing, a water-carrying two-layer pan structure 35 is placed between the fire box 22 and the grid 24 and/or spit 26. As seen best in Figure 4, the pan structure is preferably a unitary structure fabricated of sheet metal and the top layer consists of three metal pans, 36, 37 and 38, which are held in horizontally-spaced parallel relationship by a series of interconnecting channels 39 so that when the outside pan is filled with water, the water will flow into the other two pans in that layer. The bottom layer consists of four metal pans 40, 41, 42 and 43 which are held in horizontally-spaced parallel relationship by means of a plurality of interconnecting channels 44 so that when the front pan is filled with water, the water will flow into the three other pans of this layer in the same manner as in the top layer. The water pans 40, 41, 42 and 43 of the bottom layer are staggered relative to the water pans 36, 37 and 38 of the top layer so that any grease drippings from meat being cooked which drop downwardly through the spaces between the upper pans will be caught in one of the pans of the bottom layer. This feature whereby the bottom water pans are staggered relative to the upper water pans prevents grease drippings from falling upon the fuel in the fire box and causing a flare-up of the flames which is detrimental for maintaining a uniform heat for cooking purposes. This staggered arrangement of the bottom water pans relative to the top water pans also permits the heat to pass readily upwardly through the water pan structure for maintaining a uniform cooking heat in the cooking area of the stove.

A plurality of horizontally disposed members 45 are fixed as by welding to the lower faces of the upper pans 36, 37 and 38 and are similarly welded or otherwise fixed in position with respect to the lower pans 40, 41, 42, and 43 for supporting the upper layer of pans in predetermined vertically spaced and staggered position. The two layers of water pans are preferably spaced so that they will be supported on a pair of adjacent opposed rails 21 when the structure is placed in the interior of the stove. This distributes the weight of the water pan structure to two pairs of rails instead of to one pair and also does not cause one layer to support the other necessitating thereby a relatively more sturdy structure.

With the water pan structure located between the fire box 22 and the meat to be cooked, the meat being carried either on the grid 24, the spit 26, or on both, and the cover 32 positioned on the top of the side and back panels and the stove door in its closed position, the cooking area is filled with a combination of smoke and steam. Openings 46 are formed in cover 32 for permitting the escape of smoke and steam from the cooking area; however, these holes as formed are not large enough in area to allow all of the smoke and steam generated to escape therethrough. The majority of the smoke and steam is therefore caused to circulate around the cooking meat and is forced downwardly and out through the unclosed portion of the stove opening. It has been found that the ensuing combination of smoke, heat and steam tends to minimize the amount of shrinkage in the cooking meat inasmuch as the steam provides the proper humidity to cause the cooking meat to retain its juices.

The door 33 acts as a damper for controlling the heat in the cooking area as well as the amount of steam and smoke therein. For instance, if the door is held in a semi-open position, more smoke and steam will be allowed to escape from the cooking area of the stove than if the door is allowed to assume its closed position.

An adjusting tool 47 (see Figure 7) is provided for holding the door in a plurality of semi-open positions. The tool 47 is preferably formed of heavy weight metal strip which is fashioned into a handle portion 48 and a double butterfly head portion 49. Straps 50 are wrapped around the handle portion 48, and the head portion 49 is so shaped as to receive a side panel 10 or 11 and one edge of the stove door for holding the door in angular positions relative to the stove opening. It will be appreciated that by inserting the tool higher or lower between the side panel and the door, the door can be set in a plurality of semi-open positions. The door is also provided with a chain 51 which can be hooked to a pin 52 extending from the cover when the door is raised to its upright position. A suitable handle 53 is fixed to the door for enabling the same to be easily swung relative to cover 32.

It will be appreciated that the stove can be used for barbecuing or for ordinary grilling purposes and that it is easily portable. It will also be appreciated that the water pan structure is so designed as to allow the heat, steam and smoke to pass therethrough while still not allowing grease drippings to fall into the fire box and consequently cause a flare-up of flames. The desired cooking heat is also controlled in a number of ways so as to ensure good cooking results. For instance, the meats can be selectively positioned relative to the fire box and the door can be set in variable semi-open positions by means of adjusting tool 47.

While the water pan structure is preferably formed as a unitary structure, it will be appreciated that this need not be so and that the upper and lower layers can have any number of individual pans as long as the pans of the lower layer are staggered relative to the pans of the upper layer.

It will be seen therefore that the stove of the present invention can be used for grilling or barbecuing, that the cooking heat can be adjusted for best results, and that the steam and smoke is forced to circulate around the cooking meats sufficiently to prevent drying and shrinkage.

While I have illustrated and described a preferred form of my invention, it will be understood that my invention is not limited thereto but includes other embodiments and modifications as defined in the appended claims.

I claim:

1. In a barbecuing stove having a cooking area, meat supporting means in the cooking area, and a source of heat; a water pan structure positioned between the source of heat and the meat supporting means and comprising a plurality of horizontal individual solid-bottomed water pans in vertical and horizontal spaced relationship and staggered so that substantially all grease drippings passing between two horizontally spaced water pans will be caught in a water pan vertically spaced therebelow, whereby to prevent substantial vaporization thereof, and said pans further arranged so that at least one may be re-filled with water while the remaining pans produce steam within said stove thereby providing means for continuous steaming, said water pan structure permitting smoke, steam and heat to pass readily therethrough.

2. In a barbecuing stove having a cooking area, meat supporting means in the cooking area, and a fire box; a water pan structure positioned between said fire box and said meat supporting means and comprising an upper horizontal layer and lower horizontal layer of horizontally-spaced interconnected individual solid-bottomed water pans, the pans of the lower layer being staggered relative to the pans of the upper layer whereby substantially all grease drippings passing between adjacent pans of the upper layer will be caught in a pan of the lower layer whereby to prevent substantial vaporization thereof, and said pans further arranged so that at least one may be refilled with water while the remaining pans produce steam within said stove thereby providing means for continuous steaming, smoke, steam and heat passing readily through said structure.

3. In a barbecuing stove having a cooking area, meat supporting means in the cooking area, and a fire box; a water pan structure positioned between said fire box and said meat supporting means and comprising an upper horizontal layer and lower horizontal layer of horizontally-spaced solid-bottomed water pans, the water pans of each of said layers being interconnected so that water poured in one pan of a layer of pans will flow into the remaining pans of that layer, the pans of the bottom layer being staggered relative to the pans of the upper layer whereby substantially all grease drippings are prevented from falling through said structure whereby to prevent substantial vaporization thereof, and said pans further arranged so that at least one may be refilled with water while the remaining pans produce steam within said stove thereby providing means for continuous steaming, while smoke, steam and heat can pass readily therethrough, said upper layer being connected to said lower layer in vertically spaced relationship.

4. A barbecuing stove which includes: a pair of side panels and an interconnecting back panel; a top cover swingably associated with said top cover for closing the cooking area of said stove and adjustable into a plurality of semi-open positions below said cooking area; a fire box positioned between said side panels; meat supporting means positioned between said side panels and spaced above said fire box; and a water pan unit comprising a plurality of horizontal layers of solid bottomed water pans positioned between the side panels and between the fire box and the meat supporting means, the water pans of one of said layers being staggered relative to the water pans of the other layer so that substantially all grease drippings passing through the first layer will be caught in a water pan of the other layer whereby to prevent substantial vaporization thereof, and said pans further arranged so that at least one may be refilled with water while the remaining pans produce steam within said stove thereby providing means for continuous steaming, smoke, steam and heat readily passing through said unit.

5. A barbecuing stove which includes: a pair of side panels and a back panel; a top cover removably supported on the top of said side and back panels; a door swingably connected to said top cover for closing the cooking area of said stove and adjustable into a plurality of semi-open positions below said cooking area, the length of said door being sufficient to close a major portion of said stove; meat supporting means in the cooking area of said stove; a fire box supported between said side panels, and positioned adjacent the unclosed portion of said stove; and a water pan structure positioned between the meat supporting means and the fire box and carried between said side panels, said structure comprising an upper horizontal layer and a lower horizontal layer of solid-bottomed water pans, the pans of the upper layer being interconnected in spaced-apart substantially parallel relationship, and the water pans of the lower layer being interconnected in spaced-apart substantially parallel relationship and staggered relative to the pans of the upper layer whereby substantially all grease drippings passing through the space between adjacent pans of the upper layer will be caught in a water pan of the lower layer whereby to prevent substantial vaporization thereof, and said pans further arranged so that at least one may be refilled with water while the remaining pans produce steam within said stove thereby providing means for continuous steaming, heat, smoke and steam passing readily through said pan structure.

6. A barbecuing stove which includes: a pair of side panels and a back panel; a top cover removably supported on said side and back panels; a door swingably connected to said top cover for closing the cooking area of said stove and adjustable into a plurality of semi-open positions below said cooking area, the height of said door being more than one-half the height of said stove; meat supporting means in the cooking area of said stove; a fire box carried between said side panels and positioned adjacent the unclosed portion of said stove; a water pan structure comprising an upper horizontal layer and lower horizontal layer of horizontally spaced solid-bottomed water pans, the pans of each layer being so interconnected that water poured into one pan will flow into the remaining interconnected pans, the upper and lower layers of water pans being interconected in vertically spaced relationship and the pans of the lower layer being staggered relative to the pans of the upper layer so that substantially all grease drippings will be caught in one of said pans whereby to prevent substantialy vaporization thereof, and said pans further arranged so that at least one may be refilled with water while the remaining pans produce steam within said stove thereby providing means for continuous steaming, while smoke, steam and heat are permitted to readily pass through said pan structure; and said top cover having formed therein an opening for the escape of a portion of the smoke, the majority of smoke and steam being caused to circulate in the cooking area and move downwardly and out through the unclosed cooking area of the stove.

References Cited in the file of this patent

UNITED STATES PATENTS

| Number | Name | Date |
|---|---|---|
| 195,995 | Edwards | Oct. 9, 1877 |
| 1,471,039 | Lee | Oct. 16, 1923 |
| 1,504,102 | Davis | Aug. 5, 1924 |
| 2,004,024 | Van Voorst | June 4, 1935 |
| 2,097,793 | Howell | Nov. 2, 1937 |
| 2,143,602 | Johnson | Jan. 10, 1939 |
| 2,748,691 | Johnson | June 5, 1956 |